(12) United States Patent
Stokking et al.

(10) Patent No.: US 10,462,032 B2
(45) Date of Patent: Oct. 29, 2019

(54) PROBING A NETWORK

(71) Applicants:Koninklijke KPN N.V., The Hague (NL); Nederlandse Organisatie voor Toegepast-Natuurwetenschappelijk Onderzoek TNO, s-Gravenhage (NL)

(72) Inventors: Hans Maarten Stokking, Wateringen (NL); Frank Den Hartog, Zoeterwoude (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/104,840

(22) PCT Filed: Dec. 5, 2014

(86) PCT No.: PCT/EP2014/076720
§ 371 (c)(1),
(2) Date: Jun. 15, 2016

(87) PCT Pub. No.: WO2015/091022
PCT Pub. Date: Jun. 25, 2015

(65) Prior Publication Data
US 2016/0323171 A1 Nov. 3, 2016

(30) Foreign Application Priority Data
Dec. 19, 2013 (EP) .................... 13198364

(51) Int. Cl.
*H04L 12/58* (2006.01)
*H04L 12/26* (2006.01)
(52) U.S. Cl.
CPC .......... *H04L 43/12* (2013.01); *H04L 43/0888* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 2009/0016238 A1* | 1/2009 | Yu | ............... | H04L 41/0896 370/253 |
| 2011/0090811 A1* | 4/2011 | Ekelin | ............... | H04L 41/0896 370/252 |

(Continued)

FOREIGN PATENT DOCUMENTS

| | | |
|---|---|---|
| EP | 1335525 A2 | 8/2003 |
| EP | 1335525 A3 | 7/2005 |

OTHER PUBLICATIONS

European Search Report, European Patent Application No. 13198364. 5, dated May 21, 2014, 5 pages.

(Continued)

*Primary Examiner* — Zewdu A Beyen
(74) *Attorney, Agent, or Firm* — McDonnell Boehnen Hulbert & Berghoff LLP

(57) ABSTRACT

A method is described of probing a network route using a pairs of probe packets in which the first packets are typically smaller than the second. A first pair of probe packets with size ratio [L1/L2] and a second pair of probe packets with different size ratio [M1/M2] are transmitted onto a network route. An indicator of time taken for the second probe packet in the packet pairs to traverse the network route is derived and it is identified whether the values of the derived indicators vary or are substantially the same. The method, which can be used to probe home or domestic networks, indicates whether the first link in the route is or is not a bottleneck link, thereby providing further information about the route. A test apparatus, gateway device and computer to perform the method are also disclosed.

15 Claims, 8 Drawing Sheets

(56) References Cited

U.S. PATENT DOCUMENTS

2011/0128864 A1* 6/2011 Chan .................. H04L 43/0864
370/252
2013/0136020 A1* 5/2013 Chan .................. H04L 43/0864
370/252

OTHER PUBLICATIONS

Lai, Kevin et al., "Measuring Link Bandwidths Using a Deterministic Model of Packet Delay", Computer Communication Review, ACM, New York, NY, vol. 30, No. 4, Oct. 1, 2000, pp. 283-294.
Nicolai, F.P., "Capacity Measurement in Small-Scale Heterogeneous Best-Effort IP Networks", M. Sc. Thesis No. PVM 2009-057, TNO, TU Delft, Jul. 2, 2009, pp. 1-83.
Lai, K. et al., Measuring Bandwidth, Infocom '99, Eighteenth Annual Joint Conference of the IEEE Computer and Communications Societies, New York, NY, vol. 1, Mar. 21-25, 1999, pp. 235-245.
Dovrolis, Constantinos et al., "What do Packet Dispersion Techniques Measure", Proceedings IEEE Infocom 2001, Conference on Computer Communications, Twentieth Annual Joint Conference on the IEEE Computer and Communications Society, vol. 2, Apr. 22, 2001, pp. 905-914.
Harfoush, Khaled et al., "Measuring Capacity Bandwidth of Targeted Path Segments", IEEE/ACM Transactions on Networking, vol. 17, No. 1, Feb. 1, 2009, pp. 80-92.
De A Rocha, Antonio A. et al., An End-To-End Technique to Estimate the Transmission Rate of an IEEE 802.11 WLAN, Proceedings of the 2007 IEEE International Conference on Communications, Glasgow, UK, Jun. 1, 2007, pp. 415-420.
PCT International Search Report and Written Opinion, PCT International Application No. PCT/EP2014/076720, dated Mar. 9, 2015, 13 pages.
Delphinanto, Archi et al., "End-to-End Available Bandwidth Probing in Heterogeneous IP Home Networks", The 8th Annual IEEE Consumer Communications and Networking Conference—Multimedia & Entertainment Networking and Services, 2011 IEEE, Jan. 9-12, 2011, pp. 431-435.

\* cited by examiner

|              |    | link A  |         |         | link B  |         |         | link C  |         |
|--------------|----|---------|---------|---------|---------|---------|---------|---------|---------|
|              |    | 10000   |         |         | 4000    |         |         | 5000    |         |
|              |    | depart  | arrive  | depart  | arrive  | depart  | arrive  | arrive  |         |
| forward path | P1 | 0       | 0,0045  | 0,0045  | 0,01125 | 0,01575 | 0,01575 | 0,009   | 0,02475 |
|              | P2 | 0,0045  | 0,01    | 0,01575 | 0,025   | 0,04075 | 0,04075 | 0,02    | 0,06075 |
|              |    | arrive  |         |         | depart  | arrive  | depart  | depart  |         |
| return path  | P1 | 0,0045  | 0,0045  |         | 0,01125 | 0,03375 | 0,03375 | 0,009   | 0,02475 |
|              | P2 | 0,11575 | 0,01    |         | 0,025   | 0,08075 | 0,08075 | 0,02    | 0,06075 |

The departure time of a packet on a link is the greater of either it's arrival time at that link or the arrival time of the previous packet at the next link The round trip time of the second packet is the difference between its arrival time at the probe node and its departure time at the probe node figure 5

PROBING A NETWORK

CROSS REFERENCE TO RELATED APPLICATIONS

The present application is a national stage entry of, and claims priority to, PCT/EP2014/076720, filed on Dec. 5, 2014, which claims priority to European Patent Application EP 13198364.5, filed in the European Patent Office on Dec. 19, 2013, both of which are hereby incorporated in their entirety herein by reference.

The invention relates to a method of probing a network route using a pair of probe packets, to a gateway device for a first network and also to a test apparatus configured to probe a network route in a remote network, a device configured to probe a network route in a network and a computer program product.

BACKGROUND TO THE INVENTION

Network probing for capacity is commonly performed using one of many available methods, for example the Variable Probing Size (VPS) method and the Probe Gap Model (PGM) method.

VPS probing measures round-trip times (RTT) for variable packet sizes, and deduces capacity from the different RTTs measured. VPS uses the IP Time-To-Live parameter to measure individual hops. One major downside of VPS is that it does not work correctly when the path of the probe includes multiple network links, or multiple switches. VPS can probe link by link but only on layer-3 routes, as is known in the art, and typically because of this VPS only probes between routers in an IP network, while aggregating capacity on other, non-layer-3 links. One result of this is that VPS can underestimate path capacity. The way around this is to break down the network and apply VPS probing to the individual links that make up a path. This increases considerably the pre-knowledge needed to apply the method effectively to a network and the complexity of the method applied in an individual case. However, even this breaks down if switches or other layer-2 or layer-1 devices are included in the network. A domestic network typically includes such non-layer-3 devices.

An alternative, PGM probing, uses 2 back-to-back probe packets of the same size. Sending two packets back-to-back means that there is no transmission delay between the two sent packets. This is known by the skilled person. However as these packets travel across various network links to their destination they will suffer various delays.

Serialization delay in a network is the delay caused by the bandwidth of the medium on which packets are sent. It is the time that is needed to transmit the packet. For a packet of size L (bits) at a link of transmission rate C (bits/s), the serialization delay is equal to L/C. For example, to send a packet of 10,000 bits on a link with a transmission rate of 10,000,000 bits/second, it will take 0.001 second or 1 millisecond to transmit the packet. Serialization delay is dependent on the packet size and is the time it takes to actually transmit a packet.

Queuing delay is the delay suffered by a probing packet because of cross traffic. If multiple data streams are sent across the same network link, they are normally queued and buffered and then transmitted one packet at a time on the network link. This can mean that a probing packet is buffered for a certain amount of time, awaiting its turn to be transmitted. This delay is called queuing delay. Note that such queuing delay can occur in any device on the path between sender and receiver, including the sender itself. Since this delay is dependent on other data packets, it is independent on the probing packet size.

Propagation delay is the time it takes for a packet to physically traverse a network link and is dependent on the medium used for transmission but independent of the packet size. For example, on a 50 meter Ethernet cable (CAT-cable), the propagation delay is 50 m/177,000,000 m/s=0.28 μs. Putting a 1500 byte packet (maximum normal Ethernet packet size) on a 1 Gbit/s network link causes a serialization delay of 1500*8 bits/1,000,000,000 bits/s=12 μs. The propagation delay in this example is only 2.3% of the serialization delay. Thus, unless packets travel for very long distances or on very high network speeds, the propagation delay is negligible in most cases when performing network measurements.

There is also a processing delay to be taken into account. To enable measurements the probe sender and the probe receiver put a timestamp on a probe packet for 'packet sent' and for 'packet received'. However, the timestamping of the packet usually occurs due to software in the device and is not part of the network interface card itself, thus, when sending a packet, there is a small amount of time between the time of putting the timestamp on the packet and the actual transmission of the packet on the network. Similarly, there is a small amount of time between the receiving of a packet and the time of putting the timestamp on it and this small difference is called processing delay.

A final delay to be taken into account is probe reply delay, the delay caused by a receiver of a probe packet. It is the time taken to receive a probe and sent out a reply.

For determining a path's capacity with PGM, the queuing delay must be zero. Assuming the cross traffic having stochastic properties, a long enough series of probing measurements will yield at least one measurement where the queuing delay is zero. The measurement is identified by taking the minimum delay of probe packets of a number of measurements. If not negligible, the propagation delays of the PGM probes will be equal since both probe packets travel the same links. Furthermore, since the packets are of equal size, processing delays, probe reply delays and serialization delays will also be the same for both packets.

What is different, however, is the serialization delay for each network link. Network links with higher speeds have smaller serialization delays while network links with lower speeds have higher serialization delays. As both probe packets travel across different links, they are dispersed based on the serialization delays. The initial dispersion is caused by the first link, as the probe sender transmits the packets on the network. Each time the probe packets encounter a network link that is faster than at least one previously travelled slower link, the dispersion remains the same. But, each time the probe packets encounter a network link that is slower than any previously travelled link, the dispersion will increase due to the longer serialization delay.

Since the size of the dispersion between the two probe packets at the receiver is determined by the slowest network links, this means that PGM can be used to measure the bottleneck link on the probe path and in fact PGM can only measure the bottleneck link.

Capacity on this bottleneck link can be determined using well known formulae, as is known in the art.

The most advanced variety of PGM is described, for example, in Delphinanto, A. et al, "End-to-end available bandwidth probing in heterogeneous IP home networks", Consumer Communications and Networking Conference (CCNC), 2011 IEEE, pp. 431-435, 9-12 Jan. 2011. This paper shows that PGM can be used to determine bottleneck link speeds in heterogeneous networks consisting of links differing in speeds and medium, for example wired links and wireless links etc.

While PGM-probing provides the capacity and available bandwidth of a layer-2 bottleneck link in a layer-3 network path, in a multi-line network route it cannot ascertain which link is the bottleneck link.

What is needed in the art is to find out as much as possible about the network being probed.

SUMMARY OF THE INVENTION

For finding out more about the network, according to one aspect of an embodiment of the present invention, a method is disclosed of probing a network route using a pair of probe packets comprising a first probe packet l1 with size L1 and a second probe packet l2 with size L2, and in which the size of l1 is less than or equal to the size of l2, in other words L1≤L2.

The method comprises transmitting the first pair of probe packets l1 and l2 back-to-back onto the network route, in other words the second packet l2 is transmitted as soon as is possible, or without delay, after the transmission of the first probe packet l1 in any pair of probe packets. In practice this may occur if the transmission of the second packets occurs within a clock cycle of the first packet clearing the first link in the network route. This means that the first probe packet l1 is transmitted before the second probe packet l2. Because each probe packet in the pair of probe packets has a size a ratio of their sizes can be defined as [L1/L2]. The method further includes transmitting onto the network route at least one further pair of probe packets back-to-back, m1 with size M1 and m2 with size M2, in which the size of m1 is less than or equal to the size of m2, in other words M1≤M2, and further where a ratio [M1/M2] can be defined and is different from, in other words numerically different from, the ratio [L1/L2]. The method further includes deriving an indicator of the time taken for the second probe packet in the probe packet pairs to traverse the network route, and identifying if the values of the derived indicators vary or are substantially the same.

If the values of the derived indicators are substantially the same then the first link in the network route is the bottleneck link and an important piece of information has been derived about the network.

Embodiments of the present invention are particular advantageous in the probing of a home, or domestic, network because a common network topology includes a link from a network gateway device to a router with several devices, for example home computers, laptops and other domestic devices positioned behind the router. The bottleneck link in the network might be the link between the gateway device and the router but probing to and from devices and between devices is unlikely to indicate this. With knowledge that this is the bottleneck link, however, it is possible to make network management decisions, for example allowing swifter transfer of data and information by transmitting it between devices on the network behind the gateway rather than transmitting it from the gateway to each device in turn. For example, if a gateway device can ascertain that the link between itself and the router is the bottleneck link a decision can be taken to transfer data to be distributed to a single device behind the router and then to distribute it out to other devices from that one device, instead of attempting to transmit it multiple times from the gateway to each recipient device and suffering the network bottleneck link each time.

Conversely, if the values of the derived indicators vary then it can be assumed that the first link in the network route is not the bottleneck link and again, an important piece of information has been learned.

There are several ways of deriving an indicator of the time taken for the second probe packets in the probe packet pairs to traverse the network route.

In one embodiment multiple pairs of probe packets are transmitted back-to-back over the network route and the transit times for the second packet of each pair recorded. The minimum value of transit time for the second packet is used to derive the indicator of time taken for the second probe packet. In other words for any transmitted pair of probe packets with first probe packet n1 with size N1, and second probe packet n2 with size N2, the method further includes repeating measurements of pairs of probe packets n1 and n2, and deriving the indicator based on the minimum value of time taken for the second probe packet n2 to traverse the network route over the repeated pairs of probe packets n1 and n2.

As an alternative, the second probe packets in any two pairs of probe packets can be arranged to be the same size as each other. In this case the first packets of each pair would differ in size from each other in order to comply with the criterion that the ratio [L1/L2] is not equal to the ratio [M1/M2]. When both second packets in the two probe pairs are the same size as each other the time taken for each second packet to travel the route under test can be expected to be the same and the time taken for the second probe packets to traverse the route under test can be used as the derived indicator. In other words for probe packets l2 and m2, and when the condition L2=M2 is satisfied, the derived indicator is the time taken for the second probe packet to traverse the network route.

In a further embodiment the derived indicator is derived from the size of the second packet and the time taken for the second packet to traverse the route. Further, the derived indicator can be calculated from the ratio of the size of the second packet to the time taken to for the second packet to traverse the route.

The condition that the size of packet L1 is less than or equal to the size of packet L2, in other words that size L1≤ size L2, is typically satisfied if the length of packet L1, as would be understood by the skilled person, is less than the length of packet L2, or in other words length L1≤ length L2.

Typically the probe pairs are transmitted as layer-2 traffic.

As will be understood by the skilled person the packet pairs travel over a route in a network. The network comprises network paths, or routes, comprising one or more network links defined between two devices, sometimes referred to as end devices, or alternatively can be a route defined from a device A over a series of links in the network to a device B and can also be defined from device A to device B and then back over the same links to A. The latter case is often called a round-trip route. As is known in the art there are typically two ways in which a probe packet can be sent round-trip, either a packet is sent out to a destination device and the same packet is sent back from the destination to the origin, or the probe packet is sent out and the destination sends a reply packet back to the origin immediately after having received the probe packet, where the reply packet is different from the original probe packet, but is of known size. The invention can be used on either round-trip or one way routes. When the network route to be probed is a round-trip route, and in this case each pair of probe packets is sent round-trip on the network, then the time taken to traverse the network route is a round-trip time.

In an embodiment, in order to maximise the different size ratios possible for the probe packets it is particularly useful if the size of the second probe packet in any pair of probe packets is the maximum size supported by the network route.

According to another aspect of the present invention, a gateway device which works the method as described is provided. A gateway device couples a first network to a second network, and is typically used to couple a home or domestic network to the wider internet, the gateway device acting as a bridge between the home network and the internet outside the home network. In this case the first network is the home network. The gateway device is configured to probe a network route in the first network using a probe packet pair. In this case the probe pair comprises a first probe packet l1 with size L1 and a second probe packet l2 with size L2, and wherein the size of the first probe packet l1 is smaller than the size of the second probe packet l2. In other words size L1≤ size L2. The gateway is further configured to transmit the first pair of probe packets l1 and l2 back-to-back, in other words the second packet l2 is transmitted as soon as is possible, or without delay, after the transmission of the first probe packet l1 in any pair of probe packets, onto the network route. The gateway is additionally configured to transmit onto the network route at least one further pair of probe packets back-to-back, m1 and m2. Probe packet m1 has size M1 and probe packet m2 has size M2 and the size of the m1 is less than or equal to the size of m2, in other words M1≤M2. Ratios can be defined for probe packets l1, l2, m1, and m2 and the gateway is configured to transmit probe packets l1, l2, m1 and m2 wherein the ratio defined by [M1/M2] is different from the ratio defined by [L1/L2].

Further, the gateway is configured to derive an indicator of the time taken for the second probe packet in the probe packet pairs to traverse the network route, and further identify if the values of the derived indicators vary or are substantially the same.

If the values of the derived indicators are substantially the same then the first link in the network route in the first network is the bottleneck link and an important piece of information has been derived about the first network. If the values of the derived indicators vary then it can be assumed that the first link in the network route is not the bottleneck link and again, an important piece of information is now known.

Embodiments of the present invention are particular advantageous if the first network is a home, or domestic, network because these networks are typically remote from service providers providing data streams into the home and yet the topology and arrangement of links within these domestic networks might critically affect the flow of data streams within them. Knowledge of the capacity and arrangement of links in domestic networks allows valuable data management decisions to be taken and worked when organising data flow behind the gateway in the domestic network. The method as described can be worked on and from the gateway either automatically, or managed from outside the first network in which the probed route is situated. Typically, the method can be performed by software which can be installed on the gateway and this can be installed either in-situ by a locally performed software installation or upgrade, or can alternatively by downloaded onto the gateway from the wider internet.

While, in the case of domestic networks, it is particularly advantageous to perform the method from a suitably configured gateway device coupled to the network, there are other possibilities. For example, in another aspect of the present invention, the method can also be performed from any other device in the domestic network, for example a computer connected in a domestic network or any hand held computing device or even a mobile device temporarily connected into the network. In this case suitable software should be installed on the computer, or other device, to allow both performance of the method but also allow results to be transmitted to an entity outside the home network, for example to a service provider, if that is required.

In this case the method is performed from a device configured to probe a network route in a network, the device configured to probe the network route using a probe packet pair, the probe pair comprising a first probe packet l1 with size L1 and a second probe packet l2 with size L2, and in which the size of L1 is less than or equal to the size of L2. The device is also configured to transmit the first pair of probe packets l1 and l2 back-to-back, in other words the second packet l2 is transmitted as soon as is possible, or without delay, after the transmission of the first probe packet l1 in any pair of probe packets, onto the network route, the pair of probe packets having a ratio [L1/L2], and further configured to transmit onto the network route at least one further pair of probe packets back-to-back, m1 and m2, wherein the size of M1 is less than or equal to M2 but where further the ratio [M1/M2] is different from the ratio [L1/L2]. The device is also configured to derive an indicator of the time taken for the second probe packet in the probe packet pairs to traverse the network route, and further identify if the values of the derived indicators vary or are substantially the same.

As an alternative the method can be performed from outside the domestic network entirely, from a device, such as a server or other computer or a mobile device, remote even from the gateway coupling the domestic network to a wider network such as the internet.

Therefore, according to yet another aspect of the present invention a test apparatus configured to probe a network route in a remote network accessible through a gateway comprised in the remote network is disclosed. The test apparatus is configured to work the described method and may be, for example, a server, a computer, a linked network of computing devices, a laptop or other device with software capability.

In this case the test apparatus is configured to probe the network route via the gateway using a probe packet pair in which the probe pair comprises a first probe packet l1 with size L1 and a second probe packet l2 with size L2. The first probe packet l1 has a size which is smaller than the second probe packet l2, in other words the criterion L1≤L2 is satisfied. The test apparatus is further configured to transmit the first pair of probe packets l1 and l2 back-to-back, in other words the second packet l2 is transmitted as soon as is possible, or without delay, after the transmission of the first probe packet l1 in any pair of probe packets, onto the network route. The test apparatus is further configured to transmit onto the network route at least one further pair of probe packets back-to-back, m1 and m2, with respective sizes M1 and M2 and where the size M1 of m1 is less than or equal to the size M2 of m2. In other words the criterion M1≤M2 is satisfied. Again, ratios [L1/L2] and [M1/M2] may be defined for probe packets l1, l2, m1 and m2 and the ratio [M1/M2] is different from the ratio [L1/L2] for transmitted probe packets. The test apparatus is further configured to derive an indicator of the time taken for the second probe packet in the probe packet pairs to traverse the network route, and further configured to identify if the values of the derived indicators vary or are substantially the same.

BRIEF DESCRIPTION OF THE DRAWINGS

Further embodiments are described in the Figures.

FIG. 5 shows typical data values associated with a use of the method.

DETAILED DESCRIPTION

Figure 1:
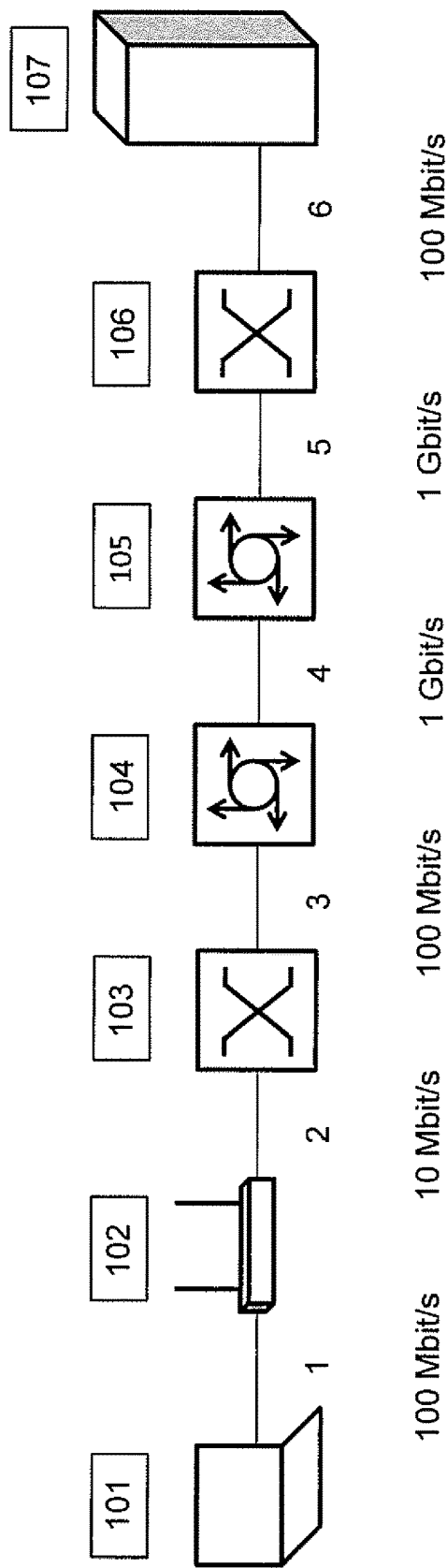
FIG. 1 gives an example of a typical network path on which the invention can be used.

FIG. 1 gives an example of a network path suitable for analysis and probing by the method described. The network path, or route, in this instance contains a linked series of devices including a laptop 101, a modem 102, two switches 103 and 106, two routers 104 and 105, and a server 107. All these devices are linked together in a manner as is known in the art. Switches 103 and 106 are layer 2 devices, for example Ethernet devices and switch 103 can for example be a DSLAM. Routers 104 and 105 are layer 3 devices, for example IP routers. In this network path the capacity of the link between the laptop 101 and modem 102 is 100 Mbit/s. The capacity of the links between the switch 103 and router 104 and between the switch 106 and server 107 are also each 100 Mbit/s. The capacity of the links between routers 104 and 105 and between router 105 and switch 106 are both 1 Gbit/s.

However the capacity of the link between the modem 102 and the switch 103 is only 10 Mbit/s and is the bottle neck link on the entire route. In other words the link between the modem 102 and the switch 103 has the smallest, or lowest, capacity of all the links in the defined, or described, route.

A PGM probe of the prior art, as is known by the skilled person, can discover that the capacity or available bandwidth of the network path bottleneck is only 10 Mbit/s, but a PGM probe cannot identify which of the network links in the network route is the bottleneck link that yields this 10 Mbit/s capacity.

Other probing techniques, such as VPS probing, are able to probe on a link-by-link basis, but only on layer-3 links, for example IP links between 2 routers. In this example a VPS probe would only be able to probe between router 104 and router 105 and cannot distinguish between the link that connects modem 102 with switch 103 and the link that connects switch 103 with router 104. Neither can it distinguish between the link that connects router 105 with switch 106 and the link that connects switch 106 and server 107. In effect a VPS prove would return results that give an overall capacity for combinations of links, in this case for the combination of the links between modem 102 and router 104 and further for the combination of the links between router 105 and server 107. VPS will treat these combinations of links as single links and therefore yield a result which is representative for none of the individual links which are comprised within them. The measured result, as identified by a VPS probe, for a combination of links will be lower than the actual lowest speed of the combined links because measurements are based on delay and combining links means adding up the delays of those links.

Therefore using only methods known in the art we see that even if probes are sent from the modem 102 in the network route and the bottleneck link is the first link between the modem 102 and ultimately the server 107 to which a probe is sent, it is impossible to place the bottleneck link using known previously methods. In other words known methods do not allow the discovery that the bottleneck link on the path from the modem 102 to the server 107 is actually this first link in that path.

The method here described allows determination of whether the first link on a network path is the bottleneck link of that path, even if that first link is a layer 2 link.

A solution to this problem involves sending a probe of two packets, back-to-back on the network, in other words with the second packet sent immediately after the first, the two packets having different sizes, typically defined in bytes, although other definitions of size may be used, and in which the smaller packet is sent first.

Typically while the probe is layer-3 traffic the probe packets are layer-2 traffic.

Because the smaller packet is sent first this first packet is generally expected to traverse the various links faster than the second packet. This will mean that the two packets will spread out, in other words disperse, with the larger and therefore slower second packet never catching up with the faster first packet on any of the links in the network route over which the packets are sent. This can be used to determine if the first link in the network path is the bottleneck link or not. This assumes a situation in which there is no cross traffic, in other words no other traffic running on the network.

Figure 2:
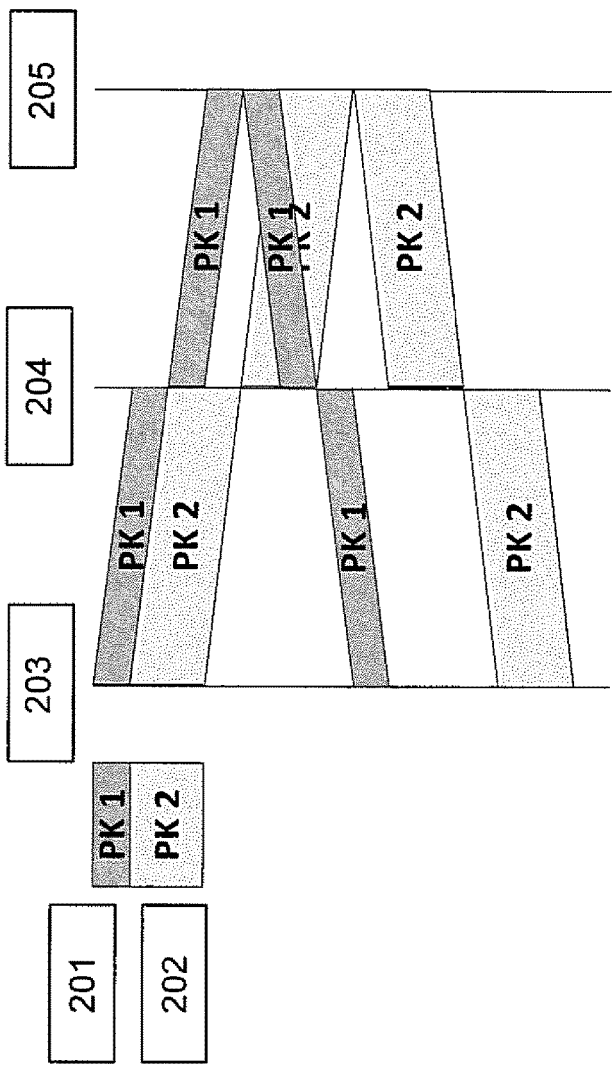
FIG. 2 is a diagram showing transmission of two packets over a simple network route, the smaller packet being transmitted first.

FIG. 2 shows what happens when two packets are transmitted over a simple network route, the smaller packet being transmitted first. Two packets, PK1 201 and PK2 202 are transmitted from source 203 over a network route defined by network device 204 and receiver 205. In this example the two probe packets are sent over a round trip route because the source 203, or the prober, sends the first packet PK1, 201, and the second packet PK2, 202, to receiver 205 via device 204 and then the receiver 205 replies. As will be understood by the skilled person, the vertical lines represent time developing from a nominal value $t_0$ at the top to the end of the probe measurement at the bottom of FIG. 2 in which all replies are received back at source 203 at some time $t_n$ later. The same overall procedure is also valid for one-way probing in which the prober, in this case source 203, or prober, sends probe packets to the receiver, or destination node, 205, without replies going back to the prober 203. In this latter case the packets 201 and 202 will arrive at the destination receiver 205 at some intermediate time $t_1$ and $t_2$. Generally the time at which a packet is deemed to have arrived, or been received, is the time at which the functional information in the packets has been wholly received and can be put to purpose.

It can be seen from FIG. 2 that how the packets behave in relation to each other in fact depends on the location of the bottleneck link and the speeds of the various different links in the probe path. This dependence is what is used in this invention to determine if the first link is the bottleneck link.

The key network effect that our invention uses is the following. If the first link is the bottleneck link, then the second packet will not be dispersed by the first packet on any of the network links, irrespective of the size of the first packet. That is, only the departure time of the second packet will depend on when the first packet has left the sender and the arrival time will change accordingly. This means that the derived indicator will have the same value irrespective of the ratio of the two packet sizes in the probe pair.

If instead the bottleneck link is further down the probed path, the second packet might suffer additional delay from the first packet at the bottleneck link. In other words the packets will be dispersed. This will depend on the ratio between the sizes of the two probe packets and the speeds of the various network links. If in a probe method two equal packet sizes were used then the two probe packets will be dispersed at the bottleneck link, however, if the first packet is much smaller than the second packet, it may have traversed the bottleneck link already when the second packet arrives at that link. In that case, no dispersion takes place. So, for very large ratios, which occurs when the two packets have almost the same size, the packet will always get dispersed at the bottleneck link, while for very small ratios, which occurs when the first packet is much smaller than the second packet, they will not, even if passing through the bottleneck link.

Dispersion can also happen at non-bottleneck links but this has no impact on the method and dispersion does not necessarily influence the result of the derived indicator.

In practice an indicator can be calculated and uses the ratio between the second packet size and the minimum round-trip-time for that packet, as an indicator for decision making regarding the question if the first link is the bottleneck or not.

$$\text{Indicator} = \frac{L2}{RTT\min} = \frac{L2}{\min_{[i=1,\ldots,n]} [Ta_{PK2(i)} - Td_{PK2(i)}]}$$

where L2 is the length of the second packet, RTTmin is the minimum round-trip time for the second packet, Ta is its arrival time and Td is its departure time.

If the first link is not the bottleneck link, the observed value for the indicator will not be the same for all packet size ratios. For large ratios L1/L2, the second packet will be dispersed somewhere on the probe path, its arrival time will increase, and the indicator will become smaller.

This allows us to determine if the first link is the bottleneck link because if the indicator remains the same for all packet pair size ratios, then the first link is the bottleneck link.

In practice two packets, PK1, a smaller packet 201, is transmitted onto the network route before PK2, a larger packet 202, and the network path is probed by this packet-pair. Then, after having observed the round-trip times probing is repeated a number of times whilst the ratio between the packet sizes is varied. Varying the ratio can be performed by keeping the second, and larger, packet at the maximum size possible for the network route. In practice this can be achieved by maintaining the size of the second packets at the maximum transmission unit (MTU) of the probe path and the skilled person will know how to achieve this. The size of the first packet is then varied from small to large or vice versa. These steps are repeated a number of times to remove the effects of cross traffic.

Therefore as is described above and as is shown in FIG. 2, if the bottleneck link is the first link in the network route then the arrival time will change accordingly, but the denominator in the equation will not change. This means that the indicator will have the same value irrespective of the ratio of the two packet sizes in the probe pair. Further, L2 remains the same throughout all measurements, the indicator can just be RTTmin.

As an example, the method allows us to differentiate between the two following scenarios which are quite similar.

Figure 3A:
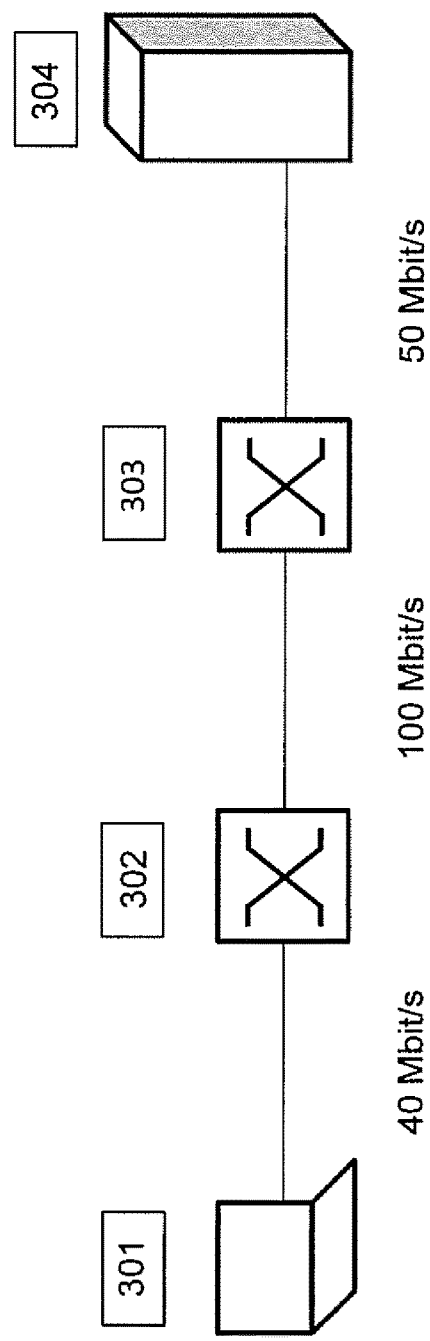
FIG. 3A shows a scenario demonstrating use of the described method.
Figure 3B:
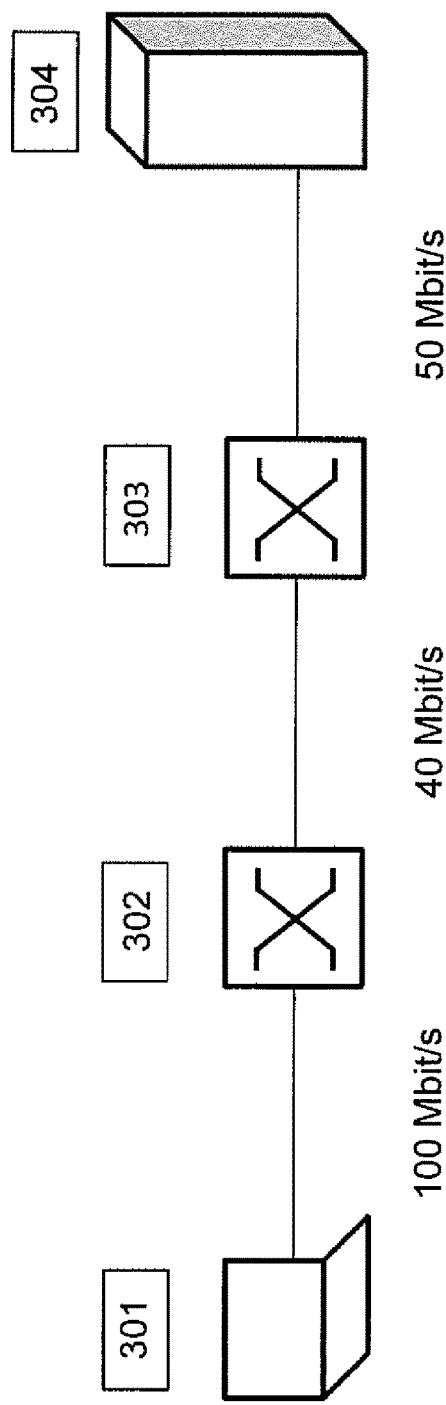
FIG. 3B shows a scenario demonstrating use of the described method.

FIGS. 3A and 3B show a short network route between a computing device 301 and a server 304. The route is made up of a series of links between the device 301 and the switch 302, the switch 302 and the switch 303, and finally the switch 303 and the server 304.

In FIG. 3A the link between device 301 and the switch 302 has a capacity of 40 Mbit/s; the link between the switch 302 and the switch 303 has a capacity of 100 Mbit/s; and the link between the switch 303 and the server 304 has a capacity of 50 Mbit/s.

In FIG. 3B the link between device 301 and the switch 302 has a capacity of 100 Mbit/s; the link between the switch 302 and the switch 303 has a capacity of 40 Mbit/s; and the link between the switch 303 and the server 304 has a capacity of 50 Mbit/s.

In other words the link speeds of the first and second links in the route are swapped in the two examples.

Using VPS probing would reveal the same value, incidentally of approximately 18 Mbit/s, for both routes. The same is true for PGM probing, which would return a result of 40 Mbit/s for the measurement of capacity. Additionally, neither probing method would allow us to find the location of the bottleneck link.

Use of the method as described to probe both routes using a second packet size described by L2=10000 bits, and varying the size of the first packet L1 between 1000 bits and 9500 bits, in increments of 500 bits. Because L2 has a fixed value, we can just use the Round-Trip-Time RTT of the second packet as the indicator. In this example we use round-trip-probing, as opposed to probing from point A to point B. The results are shown in FIGS. 4A and 4B.

Figure 4A:
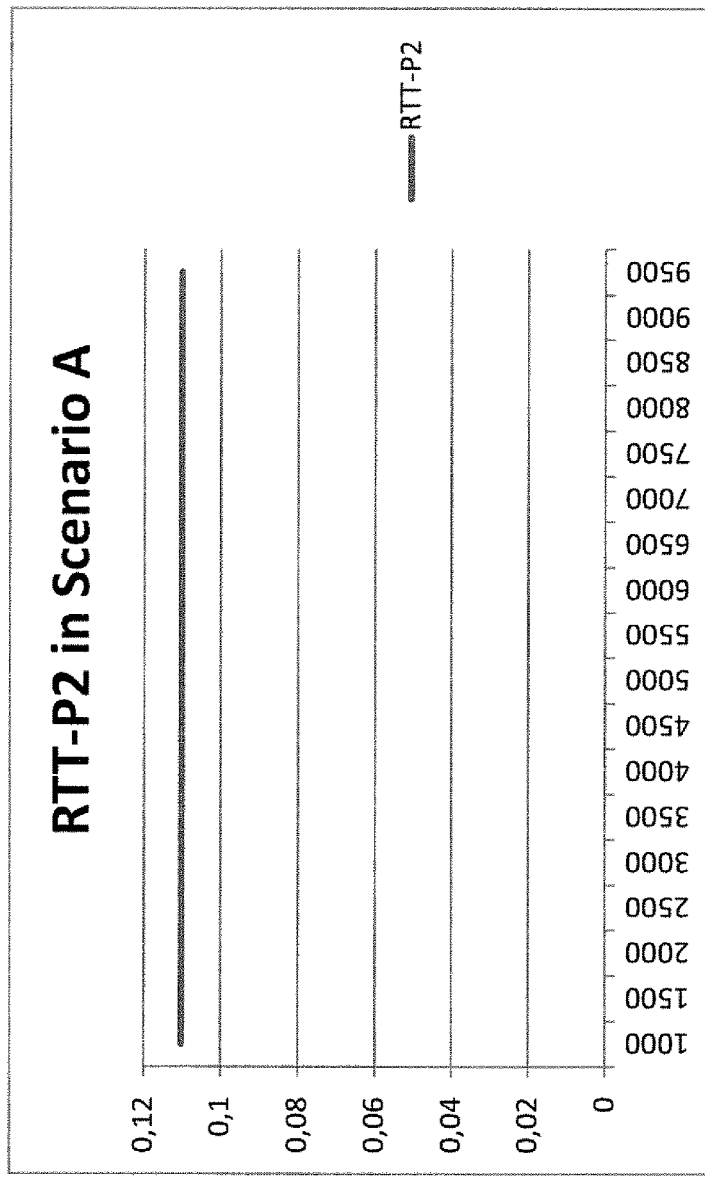
FIG. 4A shows results of use of the described method.

FIG. 4A shows the RTT of the second packet as a function of L1, where L1 is the size of the first packet, for the scenario described in FIG. 3A.

Figure 4B:
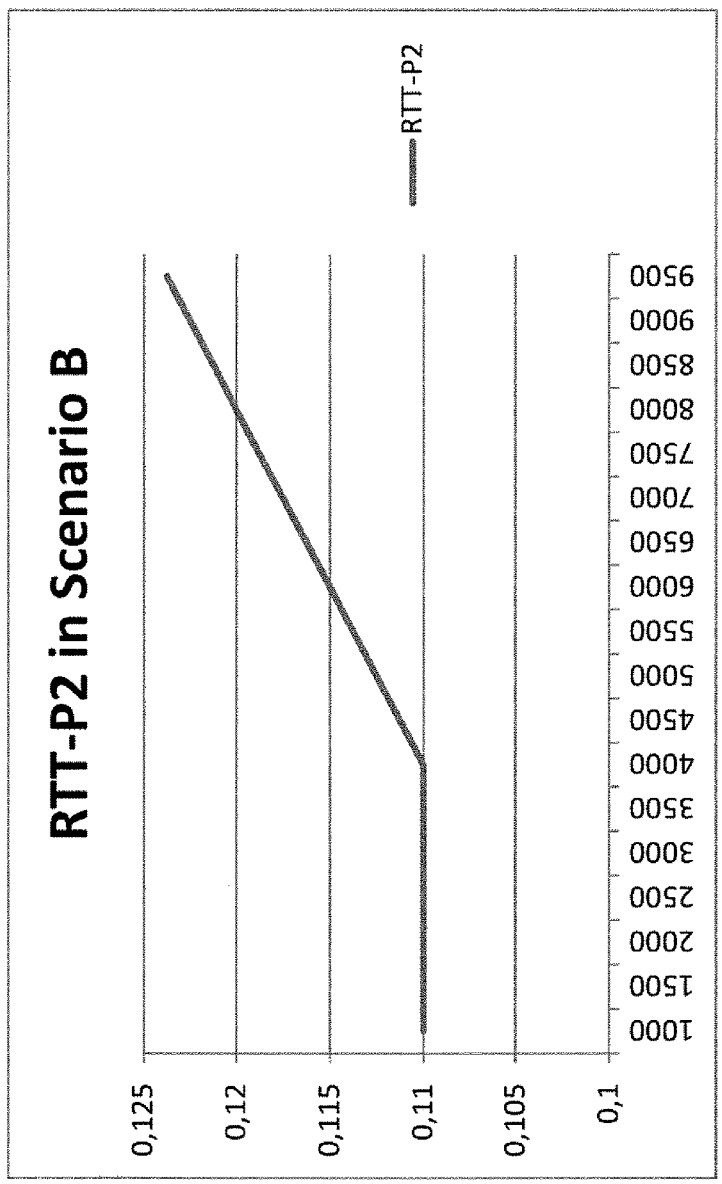
FIG. 4B shows results of use of the described method.

FIG. 4B shows the RTT of the second packet as a function of L1, where L1 is the size of the first packet, for the scenario described in FIG. 3B.

For the scenario of FIG. 3A we see that the RTT is constant, it does not depend on L1. This is because the bottleneck link is first, so the second packet is never delayed by the first one on the probe path, after it is sent out by the probe node, in this case computing device 301.

For the scenario of FIG. 3B we see that for sizes of the first packet up to L1=4000 bits, the graph is the same as the one for scenario A. After that, the first packet becomes so large that it has not passed the bottleneck link entirely before the second packet arrives there. Thus, the second packet becomes delayed a bit by the first packet, causing a longer RTT. The bigger the first packet gets, the longer it will delay the second packet and this is seen in the rising graph. Additionally, the levelling in the graph happens at the turning point at which the ratio of packet size equals the ratio of the capacity of the bottleneck link to the capacity of the first link, described by the equation $L1/L2$=capacity of the bottleneck link/capacity of the first link.

The capacity of the bottleneck link can be retrieved by using PGM probing, and from this one would be able to calculate the capacity of the first link.

For the scenario of FIG. 3B and in the case in which packets sizes are defined by L1=4500 bits and L2=10000 bits, FIG. 5 shows the departure time from the nodes at one side of the link and the arrival time at the nodes on the other side of the link. A probe packet can depart on a link if it has arrived at the node from which it can enter the link and if additionally the link is free. In other words a probe packet can begin transmission across a link if the previous probe packet has cleared that link already. For the second probe packet this means the first probe packets must have crossed the link entirely.

For the first probe packet, any link in the route will nominally always be free, because there are no prior packets from the method on the link. This assumes that cross traffic does not interfere. In practice cross traffic does interfere with measurements but the effect can be mitigated by repeating the measurement a number of times and taking the minimum measurement.

In the table of FIG. 5, which shows typical values for probe packets P1 and P2 as they progress across a network route comprising 3 links A, B and C, we can see that when the second probe packet P2 arrives at link B, at t=0.0145, the first probe packet P1 has not crossed the link entirely, so P2 has to wait until the first probe packet P1 has cleared the link entirely, at t=0.01575.

When performing the method in practice it is not always easy to know beforehand the correct minimum L1 to choose. A way to proceed is to start with the first and second packet sizes roughly equal, in other words satisfying L1≈L2, and then start decreasing the size L1 incrementally, or little by little. At first, there may not be much difference in the minimum value of the round-trip time for the second packet, RTT2, but as L1 gets smaller, the minimum value of RTT2, or min(RTT2), should get smaller in a linear relationship with L1, as shown in FIG. 4B. If this does not occur, if min(RTT2) stays the same for all values of L1, then it can be concluded that the first link is the bottleneck link.

If anomalies in results occur during this reduction in size of L1, then most likely L1 has been decreased too much. Such anomalies can occur, for example, due to other network effects.

Figure 6:
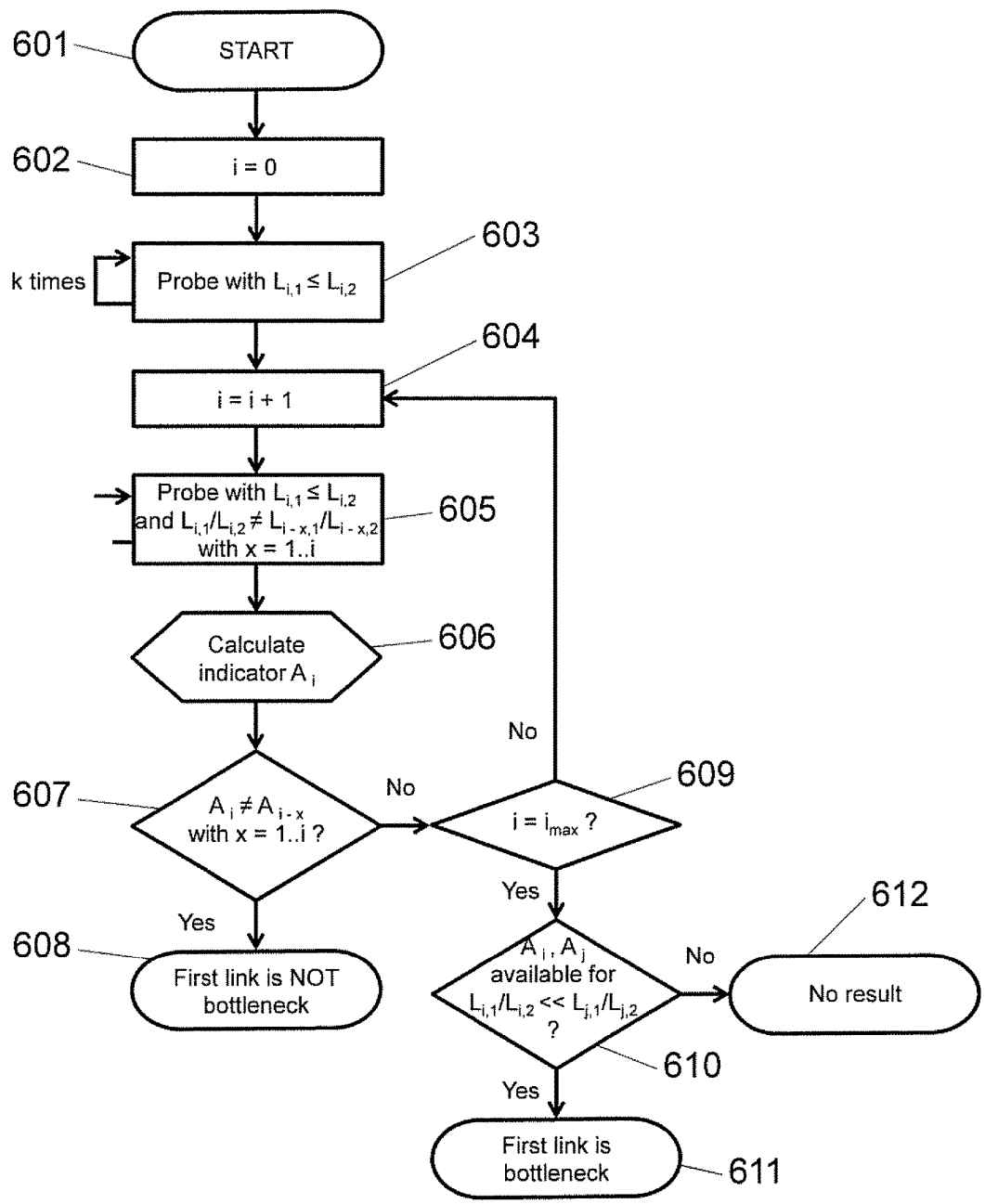
FIG. 6 shows an embodiment for working the invention.

FIG. 6 shows a flow chart of a useful embodiment for working the invention in practice. At start 601 a counter i is set at zero 602 and a probe is performed 603 with first packet size $L_{i,1}$ smaller or equal to the second packet size $L_{i,2}$. Regardless of the actual size $L_{i,1}$ and $L_{i,2}$ the probe pairs are repeated k times in order to identify the minimum round-trip times (RTTs) for this combination of packet size. After the repetition the counter i is moved on to i=1 at 604.

Following this, 605, a new pair of probes is produced in which the first packet size $L_{i,1}$ smaller or equal to the second packet size $L_{i,2}$ but with the additional requirement that the ratio of the sizes of the new first to second packet is not equal to the ratio of the sizes of the previous first to second packet. In other words:

$$L_{i,1}/L_{i,2} \neq L_{i-x-1}/L_{i-x-2}$$

for which x=1, . . . , i.

Step 605 is also repeated k time.

In step 606 an indicator, $A_i$ is calculated for all pairs $L_{i,1}/L_{i,2}$, which also includes pairs $L_{i-x-1}/L_{i-x-2}$. Alternatively indicators can be calculated as pairs are transmitted and results become available, in other words indicators for original probe pairs $L_{i,1}$ and $L_{i,2}$ sent during 603 may be calculated before subsequent probe pairs are transmitted during 605.

In step 607 it is determined if the indicator for the first probe pairs, sent during 603, is equal to the indicator for subsequent pairs of probes, sent during 605. In other words it is determined if:

$$A_i \neq A_{i-x}$$

for which x=1, . . . , i.

If the answer to this determination is yes, then the first link is not the bottleneck link, 608. If the answer to this determination is no, then it must be considered 609 if $$i = i_{max}$$

If no then the process is returned to step 604, the counter is increased by 1, another pair of probes is produced with size ratio not equal to any previous pair of probes and transmission of the probe pair is repeated k times to identify the minimum RTT. However if yes, then the process moves on to step 610 and it is ascertained if in the results generated there are indicators $A_i$ and $A_j$ for probe pairs $L_{i,1}/L_{i,2}$ and $L_{j,1}/L_{j,2}$ where:

$$L_{i,1}/L_{i,2} << L_{j,1}/L_{j,2}$$

If the answer is yes then the first link is the bottleneck, 611. If the answer is no then there is no result, 612. In the latter case the method of this embodiment can be reworked with a greater number of repeated probe pairs k, or with a larger value of i.

The invention claimed is:

1. A method of probing a network route using a pair of probe packets comprising a first probe packet l1 with size L1 and a second probe packet l2 with size L2, and wherein L1 is smaller than or equal to L2, wherein the route comprises network links including at least a first network link, the method comprising:
   transmitting the pair of probe packets l1 and l2 back-to-back onto the network route, wherein l1 is transmitted before l2, the pair of probe packets having a ratio [L1/L2];
   transmitting onto the network route at least one further pair of probe packets back-to-back, a first probe packet m1 with size M1 and a second probe packet m2 with size M2, wherein the first probe packet m1 is transmitted before the second probe packet m2, wherein M1 is smaller than or equal to M2 and further wherein the ratio [M1/M2] is different from the ratio [L1/L2];
   deriving respective indicators of the time taken for the second probe packet in each of the probe packet pairs to traverse the network route;
   comparing the values of the derived respective indicators; and
   determining that the first network link is not a bottleneck link if the values of the derived respective indicators are different.

2. The method of claim 1, comprising:
   for any given transmitted pair of probe packets having a first probe packet n1 with size N1, and a second probe packet n2 with size N2, repeating measurements of pairs of probe packets n1 and n2,
   deriving the indicator based on a minimum value of time taken for the second probe packet n2 to traverse the network route over the repeated pairs of probe packets n1 and n2.

3. The method of claim 1 wherein for probe packets l2 and m2, a condition L2 is equal to M2 is satisfied, and further wherein the derived indicator is the time taken for the second probe packet to traverse the network route.

4. The method of claim 1 wherein the derived indicator is derived from the size of the second packet and the time taken for the second packet to traverse the route.

5. The method according to claim 1 wherein the derived indicator is calculated from the ratio of the size of the second packet to the time taken to for the second packet to traverse the route.

6. The method of claim 1, wherein L1 being smaller than or equal to L2 corresponds to the length of L1 being smaller than or equal to the length of L2.

7. The method of claim 1 wherein transmitting any given pair of probe packets back-to-back into the network, including the pair and the at least one further pair, comprises transmitting a first probe of the any given pair into the network followed, without any delay, by transmitting a second probe of the any given pair into the network.

8. The method of claim 1, wherein the probe pairs are transmitted as layer-2 traffic.

9. The method of claim 1, wherein the network route is a round-trip route and further wherein each pair of probe packets is sent round-trip on the network and wherein the time taken to traverse the network route is a round-trip time.

10. The method of claim 1, wherein each pair of probe packets is transmitted onto the network route one-way.

11. The method of claim 1, wherein the size of the second probe packet in any pair of probe packets is the maximum size supported by the network route.

12. A gateway device for a first network, wherein the gateway device is configurable for coupling the first network to a second network and wherein the gateway is configured to probe a network route in the first network using a probe packet pair, the probe pair comprising a first probe packet l1 with size L1 and a second probe packet l2 with size L2, and wherein L1 is smaller than or equal to L2, wherein the route comprises network links including at least a first network link, and wherein the gateway is configured to:
    transmit the pair of probe packets l1 and l2 back-to-back onto the network route, wherein l1 is transmitted before l2, the pair of probe packets having a ratio [L1/L2];
    transmit onto the network route at least one further pair of probe packets back-to-back, a first probe packet m1 and a second probe packet m2, and wherein m1 has size M1, wherein the first probe packet m1 is transmitted before the second probe packet m2, wherein m2 has size M2 and further wherein M1 is smaller than or equal to M2 and further wherein the ratio [M1/M2] is different from the ratio [L1/L2];
    derive respective indicators of the time taken for the second probe packet in each of the probe packet pairs to traverse the network route;
    compare the values of the derived respective indicators; and
    determine that the first network link is not a bottleneck link if the values of the derived respective indicators are different.

13. A test apparatus configured to probe a network route in a remote network which is accessible through a gateway comprised in the remote network, the test apparatus being configured to probe the network route via the gateway using a probe packet pair, the probe pair comprising a first probe packet l1 with size L1 and a second probe packet l2 with size L2, and wherein L1 is smaller than or equal to L2, wherein the route comprises network links including at least a first network link, and wherein the test apparatus is configured to:
    transmit the pair of probe packets l1 and l2 back-to-back onto the network route, wherein l1 is transmitted before l2, the pair of probe packets having a ratio [L1/L2];
    transmit onto the network route at least one further pair of probe packets back-to-back, a first probe packet m1 and a second probe packet m2, wherein the first probe packet m1 is transmitted before the second probe packet m2, wherein M1 is smaller than or equal to M2 and further wherein the ratio [M1/M2] is different from the ratio [L1/L2];
    derive respective indicators of the time taken for the second probe packet in each of the probe packet pairs to traverse the network route;
    compare the values of the derived respective indicators; and
    determine that the first network link is not a bottleneck link if the values of the derived respective indicators are different.

14. A device configured to probe a network route in a network, the device configured to probe the network route using a probe packet pair, the probe pair comprising a first probe packet l1 with size L1 and a second probe packet l2 with size L2, and where L1 is smaller than or equal to L2, wherein the route comprises network links including at least a first network link, and wherein the device is configured to:
    transmit the pair of probe packets l1 and l2 back-to-back onto the network route, wherein l1 is transmitted before l2, the pair of probe packets having a ratio [L1/L2];
    transmit onto the network route at least one further pair of probe packets back-to-back, a first probe packet m1 and a second probe packet m2, wherein the first probe packet m1 is transmitted before the second probe packet m2, wherein M1 is smaller than or equal to M2 and further wherein the ratio [M1/M2] is different from the ratio [L1/L2];
    derive respective indicators of the time taken for the second probe packet in each of the probe packet pairs to traverse the network route;
    compare the values of the derived respective indicators; and
    determine that the first network link is not a bottleneck link if the values of the derived respective indicators are different.

15. A non-transient computer-readable medium having instructions stored thereon that, when executed by one or more processors, cause the one or more processors to carry out operations for probing a network route using a pair of probe packets comprising a first probe packet l1 with size L1 and a second probe packet l2 with size L2, wherein L1 is smaller than or equal to L2, wherein the route comprises network links including at least a first network link, and wherein the operations include:
    transmitting the pair of probe packets l1 and l2 back-to-back onto the network route, wherein l1 is transmitted before l2, the pair of probe packets having a ratio [L1/L2];
    transmitting onto the network route at least one further pair of probe packets back-to-back, a first probe packet m1 with size M1 and a second probe packet m2 with size M2, wherein the first probe packet m1 is transmitted before the second probe packet m2, wherein M1 is smaller than or equal to M2 and further wherein the ratio [M1/M2] is different from the ratio [L1/L2];
    deriving respective indicators of the time taken for the second probe packet in each of the probe packet pairs to traverse the network route;

comparing the values of the derived respective indicators; and determining that the first network link is not a bottleneck link if the values of the derived respective indicators are different.

* * * * *